(12) United States Patent
Shi (10) Patent No.: US 8,565,769 B2
(45) Date of Patent: Oct. 22, 2013

(54) METHOD AND SYSTEM FOR MANAGING NEIGHBORING CELL INFORMATION

(75) Inventor: Lirong Shi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1 day.

(21) Appl. No.: 13/258,958

(22) PCT Filed: Jan. 21, 2011

(86) PCT No.: PCT/CN2011/070486
§ 371 (c)(1),
(2), (4) Date: Jul. 3, 2012

(87) PCT Pub. No.: WO2011/095081
PCT Pub. Date: Aug. 11, 2011

(65) Prior Publication Data
US 2012/0270550 A1    Oct. 25, 2012

(30) Foreign Application Priority Data
Feb. 8, 2010 (CN) .......................... 2010 1 0112248

(51) Int. Cl.
*H04W 36/00* (2009.01)

(52) U.S. Cl.
USPC ........ 455/436; 455/450; 455/422.1; 370/330; 370/331; 370/341; 370/431

(58) Field of Classification Search
USPC ......... 370/342, 335, 441, 330, 331, 341, 431; 455/442, 436, 437, 450, 422.1, 63.1, 455/501, 446; 713/151
See application file for complete search history.

(56) References Cited

U.S. PATENT DOCUMENTS 8,180,344 B2 * 5/2012 Johansson et al. ......... 455/435.2
2007/0127398 A1 * 6/2007 Cai ............................. 370/254

(Continued)

FOREIGN PATENT DOCUMENTS

CN     1859752 A    11/2006
CN     1863406 A    11/2006

(Continued)

OTHER PUBLICATIONS

International Search Report in international application No. PCT/CN2011/070486, mailed on May 5, 2011.

(Continued)

*Primary Examiner* — Mahendra Patel
(74) *Attorney, Agent, or Firm* — Oppedahl Patent Law Firm LLC (57) ABSTRACT

The present disclosure discloses a method and a system for managing neighboring cell information. The method includes: a radio network controller sends a notification message to user equipment (UE), wherein the notification message includes an indication which notifies the UE to measure inter-frequency cells which are not in an inter-frequency neighboring cell list or inter-system cells which are not in an inter-system neighboring cell list; after receiving the notification message, the UE measures the inter-frequency cells, which are not in the inter-frequency neighboring cell list, indicated in the notification message, or measures the inter-system cells, which are not in the inter-system neighboring cell list, indicated in the notification message, and reports the measurement result. In the present disclosure, the UE reports a measurement result to the network side after measuring the cells which are not in the neighboring cell list, to improve the capability of the network side to obtain neighboring cell information. Based on the measurement result reported by the UE, the network side decides inter-frequency handover or inter-system handover, so that the UE performs handover in time and the call drop is prevented effectually.

22 Claims, 1 Drawing Sheet

(56) References Cited

U.S. PATENT DOCUMENTS

2007/0213086 A1* 9/2007 Claussen et al. ............... 455/513
2011/0149907 A1* 6/2011 Olsson et al. .................. 370/331
2011/0244858 A1* 10/2011 Callender ..................... 455/436

FOREIGN PATENT DOCUMENTS

| CN | 1867188 A | 11/2006 |
| CN | 1949909 A | 4/2007 |
| CN | 101360334 A | 2/2009 |
| EP | 2009932 A1 | 12/2008 |

OTHER PUBLICATIONS

English Translation of the Written Opinion of the International Search Authority in international application No. PCT/CN2011/070486, mailed on May 5, 2011.

* cited by examiner

METHOD AND SYSTEM FOR MANAGING NEIGHBORING CELL INFORMATION

TECHNICAL FIELD

The present disclosure relates to the field of radio communications, and in particular to a method and a system for managing neighboring cell information.

BACKGROUND

Guaranteeing the service continuity of a mobile user is a basic function of a mobile cellular communication system, and a main means for guaranteeing the service continuity is handover of a serving cell of a mobile station. For the convenience of handover carried out by User Equipment (UE), it is necessary for system to configure a neighbor relation for each cell so that a network side informs the UE of neighboring cell information; then, the UE reports a measurement result after measuring neighboring cells, and the network side instructs the UE to switch to a certain neighboring cell.

Which neighboring cells are around a cell is not only related to a cell distance, but also closely related to a radio environment in which the cell is located. Since a radio environment is complex, especially a high-building intensive urban environment, it is difficult to definitely determine which neighboring cells should be configured for a cell in the initial state of network planning; besides, neighboring cell information may be not updated timely in the following circumstances: a new cell is added to a system, a cell attribute is changed, a neighbor relation of a cell is not updated timely, an environment is changed, or network planers miss something. Thus, the UE can not switch to other cells timely and then a cell being serving the UE is overloaded, therefore, the signal quality of the cell is degraded, the interference becomes serious or call drop may happen to a user.

In order to configure a neighbor relation for a cell timely, adding of a neighboring cell list based on an automatic neighbor relation (ANR) function is proposed in a Long Term Evolution (LTE) system. The ANR function refers to that measurement of a new cell is performed with the assistance of UE and a measurement result is reported to a network side which then finishes the adding of the neighboring cell list; the process is accomplished by system automatically, without manually adding a neighboring cell.

The configuration omission problem of co-frequency neighboring cells can be solved by measurement of a detected set in a prior art; when UE reports a detected set, a network side determines whether a soft handover or a co-frequency hard handover can be performed; at the same time, a cell measured by the UE can be added to a list of neighboring cells which are omitted to be configured. However, the problem of configuration omission of inter-frequency neighboring cells or inter-system neighboring cells can not be solved; particularly when Time Division-Synchronous Code Division Multiple Access (TD-SCDMA), Code Division Multiple Access 2000 (CDMA2000) and Wideband Code Division Multiple Address (WCDMA) co-exist in a 2G system or a 3G system, the problem of configuration omission of neighboring cells is particularly serious; there has not developed a technical scheme for the problem of configuration omission of inter-frequency neighboring cells or inter-system neighboring cells in the prior art.

SUMMARY

The technical problem to be solved in the present disclosure is to provide a method and a system for managing neighboring cell information, for improving the capability of a network side to obtain neighboring cell information, further improving the capability of system to prevent call drop and the capability of the system to maintain the call continuity of equipment.

To solve the problem above, the present disclosure provides a method for managing neighboring cell information, including: sending a notification message by a radio network controller to User Equipment (UE), and including an indication which notifies the UE to measure inter-frequency cells which are not in an inter-frequency neighboring cell list into the notification message by the radio network controller;

after receiving the notification message, measuring, by the UE, the inter-frequency cells, which are not in the inter-frequency neighboring cell list, indicated in the notification message, and report a measurement result by the UE.

The method above may further have the following characteristics:

the step of including an indication which notifies the UE to measure inter-frequency cells which are not in an inter-frequency neighboring cell list into the notification message comprises:

adding an Automatic Neighbor Relationship Function (ANRF) information element to the notification message, for instructing the UE to measure the inter-frequency cells which are not in the inter-frequency neighboring cell list or inter-system cells which are not in an inter-system neighboring cell list.

The method above may further the following characteristics:

the inter-frequency cells which are not in the inter-frequency neighboring cell list are inter-frequency detected-set cells; the inter-frequency detected-set cells are cells other than inter-frequency monitored-set cells and inter-frequency virtual-active-set cells.

The method above may further have the following characteristics:

the notification message further includes an information unit which indicates cells required to be reported; the information unit indicates one of report modes as follows: only report the inter-frequency detected-set cells; only report the inter-frequency monitored-set cells; report the inter-frequency detected-set cells and/or the inter-frequency monitored-set cells; report the inter-frequency virtual-active-set cells and the inter-frequency detected-set cells in pairs; report the inter-frequency virtual-active-set cells and the inter-frequency monitored-set cells in pairs; report the inter-frequency virtual-active-set cells and a set of the inter-frequency detected-set cells and the inter-frequency monitored-set cells in pairs.

The method above may further have the following characteristics:

the notification message further includes a cell-number indication IE used for indicating a maximum number of inter-frequency cells or inter-system cells to which a measurement result in a message reported by the UE belongs.

The method above may further have the following characteristics:

in the step of measuring by the UE the inter-frequency cells, which are not in the inter-frequency neighboring cell list, indicated in the notification message, physical parameters measured when the UE measures neighboring cells include one or more of the following physical parameters: Common Pilot Channel Energy Per Chip Noise Ratio (CPICH Ec/N0), Common Pilot Channel Received Signal Code Power (CPICH RSCP), primary Common Control Physical Channel Received Signal Code Power (CCPCH RSCP), Timeslot Interference On Signal Code Power (ISCP) Pathloss.

The method above may further include:

determining, by the radio network controller, a target handover cell of the UE according to the measurement result reported by the UE, and updating, by the radio network controller, neighboring cell information maintained by system according to the measurement result reported by the UE.

To solve the technical problem above, the present disclosure also provides a method for managing neighboring cell information, including:

sending a notification message by a radio network controller to User Equipment (UE), and including an indication which notifies the UE to measure inter-system cells which are not in an inter-system neighboring cell list into the notification message by the radio network controller;

after receiving the notification message, measuring, by the UE, the inter-system cells, which are not in the inter-system neighboring cell list, indicated in the notification message, and reporting a measurement result by the UE.

The method above may further have the following characteristics:

the step of including an indication which notifies the UE to measure inter-system cells which are not in an inter-system neighboring cell list into the notification message includes:

adding an Automatic Neighbor Relationship Function (ANRF) information element to the notification message, for instructing the UE to measure the inter-system cells which are not in the inter-system neighboring cell list; or reusing an existing information element which shows a cell state in the notification message, for instructing the UE to measure the inter-system cells which are not in the inter-system neighboring cell list.

The method above may further have the following characteristics:

the inter-system cells which are not in the inter-system neighboring cell list are inter-system detected-set cells; the inter-system detected-set cells are cells other than inter-system monitored-set cells and inter-system virtual-active-set cells.

The method above may further have the following characteristics:

the notification message further includes an information unit which indicates cells required to be reported; the information unit indicates one of report modes as follows: only report the inter-system detected-set cells; only report the inter-system monitored-set cells; report the inter-system detected-set cells and/or the inter-system monitored-set cells; report the inter-system virtual-active-set cells and the inter-system detected-set cells in pairs; report the inter-system virtual-active-set cells and the inter-system monitored-set cells in pairs; report the inter-system virtual-active-set cells and a set of the inter-system detected-set cells and the inter-system monitored-set cells in pairs.

The method above may further have the following characteristics:

the notification message further includes a cell-number indication IE used for indicating a maximum number of inter-system cells to which a measurement result in a message reported by the UE belongs.

The method above may further have the following characteristics:

in the step of measuring by the UE the inter-system cells, which are not in the inter-system neighboring cell list, indicated in the notification message, the physical parameters measured when the UE measures neighboring cells include one or more of the following physical parameters: Common Pilot Channel Energy Per Chip Noise Ratio (CPICH Ec/N0), Common Pilot Channel Received Signal Code Power (CPICH RSCP), primary Common Control Physical Channel Received Signal Code Power (CCPCH RSCP), Timeslot Interference On Signal Code Power (ISCP) Pathloss.

The method above may further include:

determining, by the radio network controller, a target handover cell of the UE according to the measurement result reported by the UE, and updating, by the radio network controller, neighboring cell information maintained by system according to the measurement result reported by the UE.

To solve the problem above, the present disclosure also provides an automatic neighboring-cell configuration system, including a radio network controller and UE, wherein the radio network controller is configured to send a notification message to the UE and include an indication which notifies the UE to measure inter-frequency cells which are not in an inter-frequency neighboring cell list or inter-system cells which are not in an inter-system neighboring cell list into the notification message;

the UE is configured, after receiving the notification message, to measure the inter-frequency cells, which are not in the inter-frequency neighboring cell list, indicated in the notification message, or measure the inter-system cells, which are not in the inter-system neighboring cell list, indicated in the notification message, and to report a measurement result.

The system above may further have the following characteristics:

the radio network controller is configured to include an indication which notifies the UE to measure inter-frequency cells which are not in an inter-frequency neighboring cell list or inter-system cells which are not in an inter-system neighboring cell list into the notification message in following ways:

adding an Automatic Neighbor Relationship Function (ANRF) information element to the notification message, for instructing the UE to measure the inter-frequency cells which are not in the inter-frequency neighboring cell list or the inter-system cells which are not in the inter-system neighboring cell list; or reusing an existing information element which shows a cell state in the notification message, for instructing the UE to measure the inter-frequency cells which are not in the inter-frequency neighboring cell list or the inter-system cells which are not in the inter-system neighboring cell list.

The system above may further have the following characteristics:

the UE is configured to measure the inter-frequency cells, which are not in the inter-frequency neighboring cell list, indicated in the notification message, or measure the inter-system cells, which are not in the inter-system neighboring cell list, indicated in the notification message, i.e., to measure one or more of physical parameters of neighboring cell as follows: Common Pilot Channel Energy Per Chip Noise Ratio (CPICH Ec/N0), Common Pilot Channel Received Signal Code Power (CPICH RSCP), primary Common Control Physical Channel Received Signal Code Power (CCPCH RSCP), Timeslot Interference On Signal Code Power (ISCP) Pathloss.

The system above may further have the following characteristics:

the inter-frequency cells which are not in the inter-frequency neighboring cell list are inter-frequency detected-set cells; the inter-frequency detected-set cells are cells other than inter-frequency monitored-set cells and inter-frequency virtual-active-set cells;

the inter-system cells which are not in the inter-system neighboring cell list are inter-system detected-set cells; the inter-system detected-set cells are cells other than inter-system monitored-set cells and inter-system virtual-active-set cells.

The system above may further have the following characteristics:

when the notification message includes the indication which notifies the UE to measure the inter-frequency cells which are not in the inter-frequency neighboring cell list, the notification message further includes an information unit which indicates cells required to be reported; the information unit indicates one of following report modes: only report the inter-frequency detected-set cells; only report the inter-frequency monitored-set cells; report the inter-frequency detected-set cells and/or the inter-frequency monitored-set cells; report the inter-frequency virtual-active-set cells and the inter-frequency detected-set cells in pairs; report the inter-frequency virtual-active-set cells and the inter-frequency monitored-set cells in pairs; report the inter-frequency virtual-active-set cells and a set of the inter-frequency detected-set cells and the inter-frequency monitored-set cells in pairs;

when the notification message includes the indication which notifies the UE to measure the inter-system cells which are not in the inter-system neighboring cell list, the notification message further includes an information unit which indicates cells required to be reported; the information unit indicates one of following report modes: only report the inter-system detected-set cells; only report the inter-system monitored-set cells; report the inter-system detected-set cells and/or the inter-system monitored-set cells; report the inter-system virtual-active-set cells and the inter-system detected-set cells in pairs; report the inter-system virtual-active-set cells and the inter-system monitored-set cells in pairs; report the inter-system virtual-active-set cells and a set of the inter-system detected-set cells and the inter-system monitored-set cells in pairs.

The system above may further have the following characteristics:

the radio network controller is further configured to determine a target handover cell of the UE according to the measurement result reported by the UE and update neighboring cell information maintained by system according to the measurement result reported by the UE.

In the present disclosure, UE reports a measurement result to a network side after measuring neighboring cells which are not in a neighboring cell list, thereby improving the capability of the network side to obtain neighboring cell information of UE. Then the network side decides to perform inter-frequency handover or inter-system handover according to the measurement result reported by the UE so that the UE can perform handover timely to prevent call drop effectually. Besides, the network side updates the inter-frequency or inter-system neighboring cell; when transmitting a measurement control message to the UE which does not satisfy the measurement scheme, the network side uses an updated neighboring cell list so that the relevant UE can switch to a preferred cell timely and thus the call continuity of the UE can be guaranteed.

DETAILED DESCRIPTION

An automatic neighboring-cell configuration system comprises a radio network controller and UE.

The radio network controller is configured to send a notification message to the UE, and include an indication which notifies the UE to measure inter-frequency cells which are not in an inter-frequency neighboring cell list or inter-system cells which are not in an inter-system neighboring cell list into the notification message.

The notification message contains an Automatic Neighbor Relationship Function (ANRF) information element (IE) used for instructing the UE to measure the inter-frequency cells which are not in the inter-frequency neighboring cell list or the inter-system cells which are not in the inter-system neighboring cell list; or, the notification message contains an existing IE which shows a cell state, for instructing the UE to measure the inter-frequency cells which are not in the inter-frequency neighboring cell list or the inter-system cells which are not in the inter-system neighboring cell list.

The radio network controller is further configured to determine a target handover cell of the UE according to a measurement result reported by the UE and update neighboring cell information maintained by system according to the measurement result reported by the UE.

The UE is configured, after receiving the notification message, to measure the inter-frequency cells, which are not in the inter-frequency neighboring cell list, indicated in the notification message, or measure the inter-system cells, which are not in the inter-system neighboring cell list, indicated in the notification message, and report a measurement result.

The UE is further configured to measure one or more of physical parameters of a neighboring cell as follows: Common Pilot Channel Energy per chip Noise Ratio (CPICH Ec/N0), Common Pilot Channel Received Signal Code Power (CPICH RSCP), primary Common Control Physical Channel Received Signal Code Power (CCPCH RSCP), Timeslot Interference on Signal Code Power (ISCP) Pathloss, etc.

Figure 1:
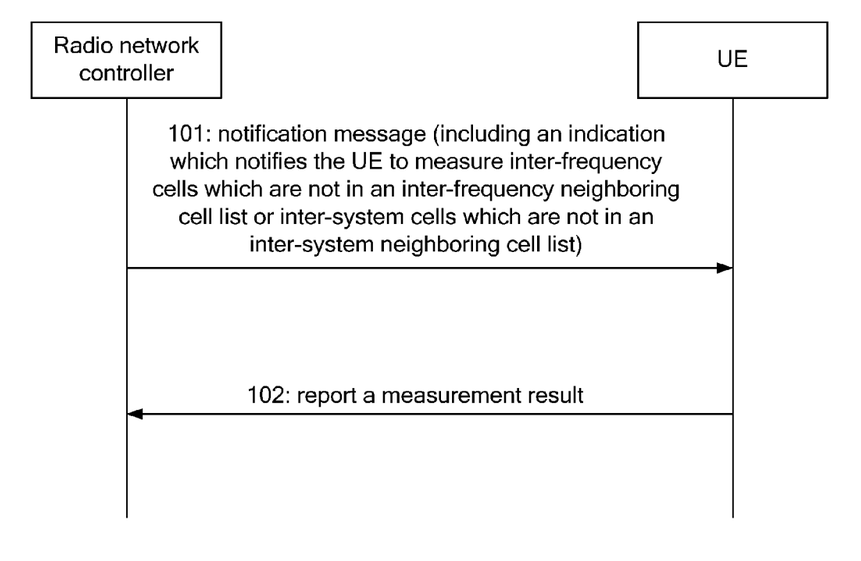
FIG. 1 shows a flowchart of a method for managing neighboring cell information according to an embodiment.

As shown in FIG. 1, the method for managing neighboring cell information comprises the following steps.

Step 101: The radio network controller sends a notification message to the UE, wherein the notification message includes an indication which notifies the UE to measure inter-frequency cells which are not in an inter-frequency neighboring cell list or inter-system cells which are not in an inter-system neighboring cell list;

the notification message contains an ANRF IE used for instructing the UE to measure the inter-frequency cells which are not in the inter-frequency neighboring cell list or the inter-system cells which are not in the inter-system neighboring cell list; or the notification message contains an existing IE which shows a cell state, for instructing the UE to measure the inter-frequency cells which are not in the inter-frequency neighboring cell list or the inter-system cells which are not in the inter-system neighboring cell list.

The notification message transmitted from the network side can be a system broadcast message, or a measurement control message, or other downlink messages.

The inter-frequency cells which are not in the inter-frequency neighboring cell list are inter-frequency detected-set cells (cells within detected set on non-used frequency); the inter-frequency detected-set cells are cells other than inter-frequency monitored-set cells and inter-frequency virtual-active-set cells (cells within monitored set on non-used frequency and all virtual active set on non-used frequency).

The inter-system cells which are not in the inter-system neighboring cell list are inter-system detected-set cells (cells within detected set on the other RAT); the inter-system detected-set cells are cells other than inter-system monitored-set cells and inter-system virtual-active-set cells (cells within monitored set on the other RAT and all virtual active set on the other RAT).

The notification message further contains a cell-number indication IE used for indicating the maximum number of inter-frequency cells to which a measurement result in a message reported by the UE belongs.

Step 102: After receiving the notification message, the UE measures the inter-frequency cells, which are not in the inter-frequency neighboring cell list, indicated in the notification message, or measures the inter-system cells, which are not in the inter-system neighboring cell list, indicated in the notification message, and reports a measurement result.

When measuring the neighboring cells, the UE measures one or more of physical
parameters as follows: Common Pilot Channel Energy Per Chip Noise Ratio (CPICH Ec/N0), Common Pilot Channel Received Signal Code Power (CPICH RSCP), primary Common Control Physical Channel Received Signal Code Power (CCPCH RSCP), Timeslot Interference on Signal Code Power (ISCP) Pathloss.

The radio network controller determines a target handover cell of the UE according to the measurement result reported by the UE so that the UE can perform handover timely to prevent call drop effectually.

The radio network controller updates neighboring cell information maintained by system according to the measurement result reported by the UE. Subsequently, when transmitting a measurement control message to UE which does not satisfy the measurement scheme, the radio network controller uses an updated neighboring cell list so that the relevant UE can switch to a preferred cell timely and thus the call continuity of the UE can be guaranteed.

The present disclosure is illustrated below in detail by specific embodiments.

Embodiment 1

Inter-frequency cells are taken as an example to illustrate the present disclosure in Embodiment 1.

Step S101: A radio network controller sends a notification message to UE, wherein the notification message includes an indication which notifies the UE to measure inter-frequency cells which are not in an inter-frequency cell list.

The notification message can be a system broadcast message, or a measurement control message, or other downlink messages.

The notification message contains an ANRF IE which also can be called an Inter-Frequency Indication for ANRF in the case of inter-frequency cells. When the system broadcast message or the measurement control message received by the UE contains this IE, the UE knows that it needs to measure inter-frequency cells which are not in an inter-frequency cell list. When the system broadcast message or the measurement control message received by the UE does not contain this IE, the UE knows that it only needs to measure cells which are in the inter-frequency cell list.

The network side also can specify, in the Inter-Frequency Indication for ANRF, specific inter-frequency cells which are not in the inter-frequency cell list; the inter-frequency neighboring cells which are not in the inter-frequency cell list are cells within detected set on non-used frequency; the cells within detected set on non-used frequency are cells other than cells within monitored set on non-used frequency and all virtual active set on non-used frequency.

Besides using a new IE to indicate measurement, the network side also can reuse an existing IE. For example, the network side can reuse an existing IE which shows a cell state, for indicating that the UE needs to measure cells which are not in the cell list. A concept of detected set on non-used frequency can be introduced, i.e., a cell set other than a monitored set on non-used frequency and all virtual active set on non-used frequency; the cell set also can be called a different name. The network side also can further specify, through the IE which shows a cell state, specific inter-frequency cells, which are not in the inter-frequency cell list; the inter-frequency neighboring cells which are not in the inter-frequency neighboring cell list are cells within detected set on non-used frequency; the cells within detected set on non-used frequency are cells other than cells within monitored set on non-used frequency and all virtual active set on non-used frequency.

The notification message also can contain an information unit which indicates a cell required to be reported; this information unit can indicate one of the following report modes: only report inter-frequency detected-set cells, wherein the information unit takes a value "Report cells within detected set on non-used frequency"; only report inter-frequency monitored-set cells, wherein the information unit takes a value "Report cells within monitored set on non-used frequency"; report inter-frequency detected-set cells and/or inter-frequency monitored-set cells, wherein the information unit takes a value "Report cells within monitored set and/or detected set on non-used frequency"; report inter-frequency virtual-active-set cells and inter-frequency detected-set cells in pairs, wherein the information unit takes a value "Report all virtual active set cells+cells within detected set on non-used frequency"; report inter-frequency virtual-active-set cells and inter-frequency monitored-set cells in pairs, wherein the information unit takes a value "Report all virtual active set cells+cells within monitored set on non-used frequency"; report inter-frequency virtual-active-set cells and a set of inter-frequency detected-set cells and inter-frequency monitored-set cells in pairs, wherein the information unit takes a value "Report all virtual active set cells+cells within monitored set and detected set on non-used frequency".

In order to save the power of the UE, the number of reported cells can be controlled; for example, a cell-number indication unit can be added for indicating the maximum number of inter-frequency cells to which a measurement result in a message reported by the UE belongs, the number can be 1 or more.

The network side can decide by itself the start of a measurement indication for the inter-frequency cells which are not in the inter-frequency cell list, or start the measurement indication after receiving a decision from a self-organization network or a network management system.

Step S102: After receiving the notification message, the UE measures the inter-frequency cells which are not in the inter-frequency cell list, and reports a measurement result.

The report comprises two report modes: periodic report and event report; if the report mode is periodic report, the UE reports a measured value to the network side periodically; if the report mode is event report, the UE compares a measurement result with an event threshold, when the measurement result is lower than the threshold value or higher than the threshold value, the UE reports the measurement result to the network side, wherein the reported result can be an event result, or an event result attached with measured physical parameters.

When the event report mode is adopted, the value of an ANRF event threshold and the value of a handover event threshold can be the same or different; if the value of the ANRF event threshold and the value of the handover event threshold are the same, the events required by both handover and ANRF can be requested to be reported through a same measurement control message; if the value of the ANRF event threshold and the value of the handover event threshold are different, an ANRF event can be reported through a next measurement control message.

The measured physical parameters can be Common Pilot Channel Energy per chip Noise Ratio (CPICH Ec/N0), Common Pilot Channel Received Signal Code Power (CPICH RSCP), primary Common Control Physical Channel Received Signal Code Power (CCPCH RSCP), Timeslot Interference On Signal Code Power (ISCP) Pathloss, and so on.

Step S103: The RNC receives the inter-frequency measurement result reported by the UE, determines to perform handover according to algorithm and instructs the UE to perform inter-frequency handover.

Step S104: The RNC receives the inter-frequency measurement result reported by the UE, determines to update inter-frequency neighboring cells according to algorithm, and sends a result to a self-organization network or a network manager to update the neighboring cells automatically.

Embodiment 2

Inter-system cells are taken as an example in Embodiment 2 to illustrate the present disclosure.

Step S201: A radio network controller sends a notification message to UE, wherein the notification message includes an indication which notifies the UE to measure inter-system cells which are not in an inter-system cell list.

The notification message can be a system broadcast message, or a measurement control message, or other downlink messages.

The notification message contains an ANRF IE which also can be called an Inter-RAT Indication for ANRF in the case of inter-system cells. When the system broadcast message or the measurement control message received by the UE contains this IE, the UE knows that it needs to measure inter-system cells which are not in an inter-system cell list. When the system broadcast message or the measurement control message received by the UE does not contain this IE, the UE knows that it only needs to measure cells which are in the inter-system cell list.

The network side also can specify through the Inter-RAT Indication for ANRF specific inter-system cells which are not in the inter-system cell list; the inter-system neighboring cells which are not in the inter-system cell list are inter-system detected-set cells (cells within detected set on the other RAT).

Besides using a new IE to indicate measurement, the network side also can reuse an existing IE. For example, the network side can reuse an existing IE which shows a cell state, for indicating that the UE needs to measure cells which are not in the cell list. A concept of detected set on the other RAT can be introduced, i.e., a cell set other than a monitored set on the other RAT and all virtual active set on the other RAT; the cell set also can be called a different name. The network side also can further specify, through the IE, specific inter-system cells which are not in the inter-system cell list which shows a cell state; the inter-system neighboring cells which are not in the inter-system cell list are cells within detected set on the other RAT.

The notification message also can contain an information unit which indicates cells required to be reported; this information unit can indicate one of the following report modes: only report inter-system detected-set cells, wherein the information unit takes a value "Report cells within detected set on the other RAT"; only report inter-system monitored-set cells, wherein the information unit takes a value "Report cells within monitored set on the other RAT"; report inter-system detected-set cells and/or inter-system monitored-set cells, wherein the information unit takes a value "Report cells within monitored set and/or detected set on the other RAT"; report inter-system virtual-active-set cells and inter-system detected-set cells in pairs, wherein the information unit takes a value "Report all virtual active set cells+cells within detected set on the other RAT"; report inter-system virtual-active-set cells and inter-system monitored-set cells in pairs, wherein the information unit takes a value "Report all virtual active set cells+cells within monitored set on the other RAT"; report inter-system virtual-active-set cells and a set of inter-system detected-set cells and inter-system monitored-set cells in pairs, wherein the information unit takes a value "Report all virtual active set cells+cells within monitored set and detected set on the other RAT".

In order to save the power of the UE, the number of reported cells can be controlled; for example, a cell-number indication unit can be added for indicating the maximum number of inter-system cells to which a measurement result in a message reported by the UE belongs, the number can be 1 or more.

The network side can decide by itself the start of a measurement indication for the inter-system cells which are not in the inter-system cell list, or start the measurement indication after receiving a decision from a self-organization network or a network management system.

Step S202: After receiving the notification message, the UE measures the inter-system cells which are not in the inter-system cell list, and reports a measurement result.

The report comprises two report modes: periodic report and event report; if the report mode is periodic report, the UE reports a measured value to the network side periodically; if the report mode is event report, the UE compares a measurement result with an event threshold, when the measurement result is lower than the threshold value or higher than the threshold value, the UE reports the measurement result to the network side, wherein the reported result can be an event result, or an event result attached with measured physical parameters.

When the event report mode is adopted, the value of an ANRF event threshold and the value of an handover event threshold can be the same or different; if the value of the ANRF event threshold and the value of the handover event threshold are the same, the events required by both handover and ANRF can be requested to be reported through a same measurement control message; if the value of the ANRF event threshold and the value of the handover event threshold are different, an ANRF event can be reported through a next measurement control message.

The measured physical parameters can be Common Pilot Channel Energy per chip Noise Ratio (CPICH Ec/N0), Common Pilot Channel Received Signal Code Power (CPICH RSCP), primary Common Control Physical Channel Received Signal Code Power (CCPCH RSCP), Timeslot Interference On Signal Code Power (ISCP) Pathloss, and so on.

Step S203: The RNC receives the inter-system measurement result reported by the UE, determines to perform handover according to algorithm and instructs the UE to perform inter-system handover.

Step S204: The RNC receives the inter-system measurement result reported by the UE, determines to update inter-system neighboring cells according to algorithm, and sends a result to a self-organization network or a network manager to update the neighboring cells automatically.

The method above is applicable to a 3 G communication system, including but not limited to a WCDMA system and a TD-SCDMA system.

The above are preferable embodiments of the present disclosure only and not intended to limit the present disclosure. For those skilled in the art, various modifications and changes can be made to the present disclosure. Any modification, equivalent substitute and improvement within the spirit and principle of the present disclosure are deemed to be included within the scope of the present disclosure.

INDUSTRIAL APPLICABILITY

In the present disclosure, UE reports a measurement result to a network side after measuring cells which are not in a neighboring cell list, so as to improve the capability of the network side to obtain neighboring cell information of the UE. Then the network side decides to perform inter-frequency handover or inter-system handover according to the measurement result reported by the UE so that the UE can perform handover timely to prevent call drop effectually. Besides, the network side updates inter-frequency or inter-system neighboring cells; when transmitting a measurement control message to UE which does not satisfy the measurement scheme, the network side uses an updated neighboring cell list so that the relevant UE can switch to a preferred cell timely and thus the call continuity of the UE can be guaranteed.

The invention claimed is:

1. A method for managing neighboring cell information, comprising:
    sending a notification message by a radio network controller to User Equipment (UE), and including an indication which notifies the UE to measure inter-frequency cells which are not in an inter-frequency neighboring cell list into the notification message by the radio network controller;
    after receiving the notification message, measuring, by the UE, the inter-frequency cells, which are not in the inter-frequency neighboring cell list, indicated in the notification message, and report a measurement result by the UE;
    wherein the step of including an indication which notifies the UE to measure inter-frequency cells which are not in an inter-frequency neighboring cell list into the notification message comprises:
    adding an Automatic Neighbor Relationship Function (ANRF) information element to the notification message, for instructing the UE to measure the inter-frequency cells which are not in the inter-frequency neighboring cell list or inter-system cells which are not in an inter-system neighboring cell list;
    and wherein the notification message further comprises an information unit which indicates cells required to be reported; the information unit indicates one of report modes as follows: only report the inter-frequency detected-set cells; only report the inter-frequency monitored-set cells; report the inter-frequency detected-set cells and/or the inter-frequency monitored-set cells; report the inter-frequency virtual-active-set cells and the inter-frequency detected-set cells in pairs; report the inter-frequency virtual-active-set cells and the inter-frequency monitored-set cells in pairs; report the inter-frequency virtual-active-set cells and a set of the inter-frequency detected-set cells and the inter-frequency monitored-set cells in pairs.

2. The method according to claim 1, wherein
the inter-frequency cells which are not in the inter-frequency neighboring cell list are inter-frequency detected-set cells; the inter-frequency detected-set cells are cells other than inter-frequency monitored-set cells and inter-frequency virtual-active-set cells.

3. The method according to claim 1, wherein
the notification message further comprises a cell-number indication information element used for indicating a maximum number of inter-frequency cells or inter-system cells to which a measurement result in a message reported by the UE belongs.

4. The method according to claim 1, wherein
in the step of measuring by the UE the inter-frequency cells, which are not in the inter-frequency neighboring cell list, indicated in the notification message, physical parameters measured when the UE measures neighboring cells include one or more of following physical parameters: Common Pilot Channel Energy Per Chip Noise Ratio (CPICH Ec/N0), Common Pilot Channel Received Signal Code Power (CPICH RSCP), primary Common Control Physical Channel Received Signal Code Power (CCPCH RSCP), Timeslot Interference On Signal Code Power (ISCP) Pathloss.

5. The method according to claim 1, further comprising:
determining, by the radio network controller, a target handover cell of the UE according to the measurement result reported by the UE, and updating, by the radio network controller, neighboring cell information maintained by system according to the measurement result reported by the UE.

6. A method for managing neighboring cell information, comprising:
    sending a notification message by a radio network controller to User Equipment (UE), and including an indication which notifies the UE to measure inter-system cells which are not in an inter-system neighboring cell list into the notification message by the radio network controller;
    after receiving the notification message, measuring, by the UE, the inter-system cells, which are not in the inter-system neighboring cell list, indicated in the notification message, and reporting a measurement result by the UE;
    wherein the step of including an indication which notifies the UE to measure inter-system cells which are not in an inter-system neighboring cell list into the notification message comprises:
    adding an Automatic Neighbor Relationship Function (ANRF) information element to the notification message, for instructing the UE to measure the inter-system cells which are not in the inter-system neighboring cell list; or
    reusing an existing information element which shows a cell state in the notification message, for instructing the UE to measure the inter-system cells which are not in the inter-system neighboring cell list;
    and wherein the notification message further comprises an information unit which indicates cells required to be reported; the information unit indicates one of report modes as follows: only report the inter-system detected-set cells; only report the inter-system monitored-set cells; report the inter-system detected-set cells and/or the inter-system monitored-set cells; report the inter-system virtual-active-set cells and the inter-system detected-set cells in pairs; report the inter-system virtual-active-set cells and the inter-system monitored-set cells in pairs; report the inter-system virtual-active-set cells and a set of the inter-system detected-set cells and the inter-system monitored-set cells in pairs.

7. The method according to claim 6, wherein
the inter-system cells which are not in the inter-system neighboring cell list are inter-system detected-set cells;

the inter-system detected-set cells are cells other than inter-system monitored-set cells and inter-system virtual-active-set cells.

8. The method according to claim 6, wherein
the notification message further comprises a cell-number indication information element used for indicating a maximum number of inter-system cells to which a measurement result in a message reported by the UE belongs.

9. The method according to claim 6, wherein
in the step of measuring by the UE the inter-system cells, which are not in the inter-system neighboring cell list, indicated in the notification message, physical parameters measured when the UE measures neighboring cells includes one or more of following physical parameters: Common Pilot Channel Energy Per Chip Noise Ratio (CPICH Ec/N0), Common Pilot Channel Received Signal Code Power (CPICH RSCP), primary Common Control Physical Channel Received Signal Code Power (CCPCH RSCP), Timeslot Interference On Signal Code Power (ISCP) Pathloss.

10. The method according to claim 6, further comprising:
determining, by the radio network controller, a target handover cell of the UE according to the measurement result reported by the UE, and updating, by the radio network controller, neighboring cell information maintained by system according to the measurement result reported by the UE.

11. An automatic neighboring-cell configuration system, comprising a radio network controller and UE, wherein
the radio network controller is configured to send a notification message to the UE and include an indication which notifies the UE to measure inter-frequency cells which are not in an inter-frequency neighboring cell list or inter-system cells which are not in an inter-system neighboring cell list into the notification message;
the UE is configured, after receiving the notification message, to measure the inter-frequency cells, which are not in the inter-frequency neighboring cell list, indicated in the notification message, or measure the inter-system cells, which are not in the inter-system neighboring cell list, indicated in the notification message, and to report a measurement result;
wherein the radio network controller is configured to include an indication which notifies the UE to measure inter-frequency cells which are not in an inter-frequency neighboring cell list or inter-system cells which are not in an inter-system neighboring cell list into the notification message in following ways:
adding an Automatic Neighbor Relationship Function (ANRF) information element to the notification message, for instructing the UE to measure the inter-frequency cells which are not in the inter-frequency neighboring cell list or the inter-system cells which are not in the inter-system neighboring cell list; or
reusing an existing information element which shows a cell state in the notification message, for instructing the UE to measure the inter-frequency cells which are not in the inter-frequency neighboring cell list or the inter-system cells which are not in the inter-system neighboring cell list;
and wherein when the notification message includes the indication which notifies the UE to measure the inter-frequency cells which are not in the inter-frequency neighboring cell list, the notification message further includes an information unit which indicates cells required to be reported; the information unit indicates one of following report modes: only report the inter-frequency detected-set cells; only report the inter-frequency monitored-set cells; report the inter-frequency detected-set cells and/or the inter-frequency monitored-set cells; report the inter-frequency virtual-active-set cells and the inter-frequency detected-set cells in pairs; report the inter-frequency virtual-active-set cells and the inter-frequency monitored-set cells in pairs; report the inter-frequency virtual-active-set cells and a set of the inter-frequency detected-set cells and the inter-frequency monitored-set cells in pairs;
when the notification message includes the indication which notifies the UE to measure the inter-system cells which are not in the inter-system neighboring cell list, the notification message further includes an information unit which indicates cells required to be reported; the information unit indicates one of following report modes: only report the inter-system detected-set cells; only report the inter-system monitored-set cells; report the inter-system detected-set cells and/or the inter-system monitored-set cells; report the inter-system virtual-active-set cells and the inter-system detected-set cells in pairs; report the inter-system virtual-active-set cells and the inter-system monitored-set cells in pairs; report the inter-system virtual-active-set cells and a set of the inter-system detected-set cells and the inter-system monitored-set cells in pairs.

12. The system according to claim 11, wherein
the UE is configured to measure the inter-frequency cells, which are not in the inter-frequency neighboring cell list, indicated in the notification message, or measure the inter-system cells, which are not in the inter-system neighboring cell list, indicated in the notification message, i.e., to measure one or more of physical parameters of neighboring cell as follows: Common Pilot Channel Energy Per Chip Noise Ratio (CPICH Ec/N0), Common Pilot Channel Received Signal Code Power (CPICH RSCP), primary Common Control Physical Channel Received Signal Code Power (CCPCH RSCP), Timeslot Interference On Signal Code Power (ISCP) Pathloss.

13. The system according to claim 11, wherein
the inter-frequency cells which are not in the inter-frequency neighboring cell list are inter-frequency detected-set cells; the inter-frequency detected-set cells are cells other than inter-frequency monitored-set cells and inter-frequency virtual-active-set cells;
the inter-system cells which are not in the inter-system neighboring cell list are inter-system detected-set cells; the inter-system detected-set cells are cells other than inter-system monitored-set cells and inter-system virtual-active-set cells.

14. The system according to claim 11, wherein
the radio network controller is further configured to determine a target handover cell of the UE according to the measurement result reported by the UE and update neighboring cell information maintained by system according to the measurement result reported by the UE.

15. The method according to claim 2, further comprising:
determining, by the radio network controller, a target handover cell of the UE according to the measurement result reported by the UE, and updating, by the radio network controller, neighboring cell information maintained by system according to the measurement result reported by the UE.

16. The method according to claim 3, further comprising:
determining, by the radio network controller, a target handover cell of the UE according to the measurement result reported by the UE, and updating, by the radio network controller, neighboring cell information maintained by system according to the measurement result reported by the UE.

17. The method according to claim 4, further comprising: determining, by the radio network controller, a target handover cell of the UE according to the measurement result reported by the UE, and updating, by the radio network controller, neighboring cell information maintained by system according to the measurement result reported by the UE.

18. The method according to claim 7, further comprising: determining, by the radio network controller, a target handover cell of the UE according to the measurement result reported by the UE, and updating, by the radio network controller, neighboring cell information maintained by system according to the measurement result reported by the UE.

19. The method according to claim 8, further comprising: determining, by the radio network controller, a target handover cell of the UE according to the measurement result reported by the UE, and updating, by the radio network controller, neighboring cell information maintained by system according to the measurement result reported by the UE.

20. The method according to claim 9, further comprising: determining, by the radio network controller, a target handover cell of the UE according to the measurement result reported by the UE, and updating, by the radio network controller, neighboring cell information maintained by system according to the measurement result reported by the UE.

21. The system according to claim 12, wherein the radio network controller is further configured to determine a target handover cell of the UE according to the measurement result reported by the UE and update neighboring cell information maintained by system according to the measurement result reported by the UE.

22. The system according to claim 13, wherein the radio network controller is further configured to determine a target handover cell of the UE according to the measurement result reported by the UE and update neighboring cell information maintained by system according to the measurement result reported by the UE.

* * * * *